United States Patent
Varadarajan et al.

(10) Patent No.: US 9,760,348 B2
(45) Date of Patent: Sep. 12, 2017

(54) VERIFICATION OF A DATAFLOW REPRESENTATION OF A PROGRAM THROUGH STATIC TYPE-CHECKING

(75) Inventors: Krishnan Varadarajan, Redmond, WA (US); Michael L. Chu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 850 days.

(21) Appl. No.: 12/954,915

(22) Filed: Nov. 29, 2010

(65) Prior Publication Data

US 2012/0137277 A1 May 31, 2012

(51) Int. Cl.
*G06F 9/45* (2006.01)

(52) U.S. Cl.
CPC .............. *G06F 8/433* (2013.01); *G06F 8/437* (2013.01)

(58) Field of Classification Search
USPC ......................................................... 717/147
See application file for complete search history.

(56) References Cited

U.S. PATENT DOCUMENTS

| | | |
|---|---|---|
| 6,182,277 B1 | 1/2001 | DeGroot et al. |
| 6,321,373 B1 | 11/2001 | Ekanadham et al. |
| 6,457,172 B1 | 9/2002 | Carmichael et al. |
| 7,000,151 B2 | 2/2006 | Dwyer |
| 7,055,142 B2 | 5/2006 | Meredith et al. |
| 7,100,164 B1 | 8/2006 | Edwards |
| 7,210,145 B2 | 4/2007 | Srinivasan |
| 7,401,329 B2 | 7/2008 | De Rijck |
| 7,415,700 B2 | 8/2008 | Pomaranski et al. |
| 7,458,066 B2 | 11/2008 | Rhine |
| 7,660,884 B2 | 2/2010 | Pu |
| 7,676,791 B2 | 3/2010 | Hamby et al. |
| 7,739,663 B2 | 6/2010 | Newcomb, Jr. |

(Continued)

FOREIGN PATENT DOCUMENTS

JP    2007328415    12/2007

OTHER PUBLICATIONS

Vasconcelos, et al., "Typechecking a Multithreaded Functional Language with Session Types," retrieved at <<http://citeseerx.ist.psu.edu/viewdoc/download?doi=10.1.1.139.2836&rep=rep1&type=pdf>>, Theoretical Computer Science, vol. 368, No. 1-2, Dec. 2006, pp. 1-39.

(Continued)

*Primary Examiner* — Ryan Coyer
(74) *Attorney, Agent, or Firm* — Dicke, Billig & Czaja, PLLC

(57) ABSTRACT

Functionality is described for providing a compiled program that can be executed in a parallel and a distributed manner by any selected runtime environment. The functionality includes a compiler module for producing the compiled program based on a dataflow representation of a program (i.e., a dataflow-expressed program). The dataflow-expressed program, in turn, includes a plurality of tasks that are connected together in a manner specified by a graph (such as a directed acyclic graph). The compiler module also involves performing static type-checking on the dataflow-expressed program to identify the presence of any mismatch errors in the dataflow-expressed program. By virtue of this approach, the above-described functionality can identify any errors in constructing the graph prior to its instantiation and execution in a runtime environment.

19 Claims, 10 Drawing Sheets

(56) References Cited

U.S. PATENT DOCUMENTS

| | | | |
|---|---|---|---|
| 9,600,250 | B2 | 3/2017 | Varadarajan et al. |
| 9,600,255 | B2 | 3/2017 | Varadarajan et al. |
| 2003/0229639 | A1 | 12/2003 | Carlson et al. |
| 2004/0015502 | A1 | 1/2004 | Alexander et al. |
| 2004/0098374 | A1 | 5/2004 | Bayliss et al. |
| 2004/0205179 | A1 | 10/2004 | Hunt et al. |
| 2005/0166182 | A1 | 7/2005 | Wang et al. |
| 2007/0027912 | A1 | 2/2007 | Chrysanthakopoulos |
| 2007/0214171 | A1 | 9/2007 | Behnen et al. |
| 2007/0245319 | A1 | 10/2007 | Muenkel et al. |
| 2008/0201721 | A1 | 8/2008 | Little et al. |
| 2008/0271042 | A1 | 10/2008 | Musuvathi et al. |
| 2008/0282238 | A1 | 11/2008 | Meijer et al. |
| 2009/0158248 | A1 | 6/2009 | Linderman et al. |
| 2009/0183144 | A1 | 7/2009 | Aupperle et al. |
| 2009/0292797 | A1 | 11/2009 | Cromp et al. |
| 2009/0307660 | A1 | 12/2009 | Srinivasan |
| 2009/0327458 | A1 | 12/2009 | Liu et al. |
| 2010/0153959 | A1 | 6/2010 | Song et al. |
| 2010/0175049 | A1 | 7/2010 | Ramsey et al. |
| 2010/0250564 | A1 | 9/2010 | Agarwal et al. |
| 2012/0089967 | A1 | 4/2012 | Varadarajan et al. |
| 2012/0089968 | A1 | 4/2012 | Varadarajan et al. |
| 2012/0089969 | A1 | 4/2012 | Varadarajan et al. |

OTHER PUBLICATIONS

Gillick, et al., "MapReduce: Distributed Computing for Machine Learning," retrieved at <<http://www.icsi.berkeley.edu/~arlo/publications/gillick_cs262a_proj.pdf >>, Dec. 18, 2006, 12 pages.

Flanagan, Cormac, "Hybrid Type Checking," retrieved at <<http://www.soe.ucsc.edu/~cormac/papers/pop106-hybrid.ps>>, The 33rd Annual ACM SIGPLAN-SIGACT Symposium on Principles of Programming Languages, Jan. 2006, 16 pages.

Isard, et al., "Dryad: Distributed Data-Parallel Programs from Sequential Building Blocks," retrieved from <<http://research.microsoft.com/pubs/63785/eurosys07.pd>>, Proceedings of European Conference on Computer Systems, 2007, 14 pages.

Yu, et al., "DryadLINQ: A System for General-Purpose Distributed Data-Parallel Computing Using a High-Level Language," retrieved at <<http://research.microsoft.com/en-us/projects/DryadLINQ/DryadLINQ.pdf>>, Proceedings of the 8th Symposium on Operating Systems Design and Implementation, 2008, 14 pages.

Yu, et al., "Some Sample Programs Written in DryadLINQ," retrieved from <<http://research.microsoft.com/pubs/66811/programming-dryadlinq-dec2009.pdf>>, Microsoft Research Technical Report No. MSR-TR-2009-182, Microsoft Corporation, Redmond, Washington, 2009, 37 pages.

Isard, et al., "Distributed Data-Parallel Computing Using a High-Level Programming Language," retrieved from <<http://research.microsoft.com/pubs/102137/sigmod09.pdf>>, Proceedings of the 35th SIGMOD International Conference on Management of Data, 2009, 8 pages.

Dean, et al., "MapReduce: Simplified Data Processing on Large Clusters," retrieved from <<http://static.googleusercontent.com/external_content/untrusted_dlcp/labs.google.com/en/us/papers/mapreduce-osdi04.pdf>>, OSDI 2004, 2004, 13 pages.

Yu, et al., "Distributed Aggregation for Data-parallel Computing: Interfaces and Implementations," retrieved at <<http://www.sigops.org/sosp/sosp09/papers/yu-sosp09.pdf>>, Proceedings of the ACM SIGOPS 22nd Symposium on Operating Systems Principles, 2009, 17 pages.

Gunal, Atilla, "Resource Management in Concurrency Runtime—Part 2," retrieved at <<http://blogs.msdn.com/b/nativeconcurrency/archive/2009/07/21/resource-management-in-concurrency-runtime-part-2.aspx >>, MSDN Blogs, Microsoft Corporation, Redmond, WA, Jul. 21, 2009, 2 pages.

Schneider, et al., "Elastic Scaling of Data Parallel Operators in Stream Processing," retrieved at <<http://people.cs.vt.edu/~scschnei/papers/ipdps09.pdf >>, International Symposium on Parallel & Distributed Processing, IEEE, May 2009, 12 pages.

Tran, et al., "Parallel Programming with Data Driven Model," retrieved at <<http://ieeexplore.ieee.org/stamp/stamp.jsp?arnumber=00823413>>, Proceedings of the 8th Euromicro Workshop on Parallel and Distributed Processing, 2000, 7 pages.

Sen, Siddhartha, "Dynamic Processor Allocation for Adaptively Parallel Work-Stealing Jobs," retrieved at <<http://supertech.csail.mit.edu/papers/sid-thesis.pdf >>, Thesis, Massachusetts Institute of Technology, Sep. 2004, 82 pages.

Penry, et al., "Exposing Parallelism and Locality in a Runtime Parallel Optimization Framework," retrieved at <<http://bardd.ee.byu.edu/Publications/cf10_adopar.pdf>>, Proceedings of the 7th ACM International Conference on Computing Frontiers, May 2010, 2 pages.

Rauchwerger, Lawrence, "Run-Time Parallelization: It's Time Has Come," retrieved at <<http://citeseerx.ist.psu.edu/viewdoc/download?doi=10.1.1.77.200&rep=rep1&type=pdf>>, Parallel Computing—Special issues on languages and Compilers for Parallel, vol. 24, Issue 3-4, 1998, 25 pages.

Groff, Dana, "Lighting up Windows Server 2008 R2 Using the ConcRT on UMS," retrieved at <<http://www.microsoftpdc.com/2009/SVR10 >>, PDC10, Microsoft Corporation, Redmond, Washington, Jul. 16, 2010, 2 pages.

"Concurrency Runtime Versus Other Concurrency Models," retrieved at <<http://msdn.microsoft.com/en-us/library/dd998048.aspx >>, MSDN, Microsoft Corporation, Redmond, Washington, Jul. 16, 2010, 4 pages.

Tetterton, James C., "ParaFitter: Automatic Runtime Concurrency Configuration for Parallel Scientific Applications," retrieved at <<http://citeseerx.ist.psu.edu/viewdoc/download?doi=10.1.1.91.2198&rep=rep1&type=pdf>>, Dissertation, North Carolina State University, 2007, 50 pages.

Saltz, et al., "Run-Time Parallelization and Scheduling of Loops," retrieved at <<http://citeseerx.ist.psu.edu/viewdoc/download;jsessionid=A9B5A8D2338A9DD51BF6F514E3D7E442?doi=10.1.1.104.7198&rep=rep1&type=pdf>>, Proceedings of the First Annual ACM Symposium on Parallel Algorithms and Architectures, Jun. 1989, 35 pages.

Blochinger, et al., "The Design of an API for Strict Multithreading in C++ Wolfgang Blochinger," retrieved at <<http://citeseerx.ist.psu.edu/viewdoc/download?doi=10.1.1.95.2053&rep=rep1&type=pdf>>, Parallel Processing, 9th International Euro-Par Conference, 2003, 10 pages.

Assenmacher, et al., "PANDA—Supporting Distributed Programming in C++," retrieved at <<http://citeseerx.ist.psu.edu/viewdoc/download?doi=10.1.1.37.6262&rep=rep1&type=pdf >>, Proceedings of the 7th European Conference on Object-Oriented Programming, Jul. 1993, 23 pages.

Chen, et al., "An Efficient Method for Expressing Active Object in C++," retrieved at <<acm.org>>, ACM SIGSOFT, Software Engineering Notes, vol. 25, No. 3, May 2000, pp. 32-35.

Wyk, Christopher J. Van, "Arithmetic Equality Constraints as C++ Statements," retrieved at <<http://citeseerx.ist.psu.edu/viewdoc/download?doi=10.1.1.14.2306&rep=rep1&type=pdf>>, Software—Practice and Experience, vol. 22, No. 6, Jun. 1992, pp. 467-494.

Sen, Ranjan, "Developing Parallel Programs," retrieved at <<http://msdn.microsoft.com/en-us/library/cc983823.aspx>>, MSDN, Microsoft Corporation, Redmond, Washington, Sep. 2008, 13 pages.

Hofstedt, et al., "Turtle++ —A CIP-Library for C++", retrieved at <<http://citeseerx.ist.psu.edu/viewdoc/download?doi=10.1.1.146.5490&rep=rep1&type=pdf >>, 16th International Conference on Applications of Declarative Programming and Knowledge Management, INAP 2005, 2005, 13 pages.

Sobral, et al., "ParC++: A Simple Extension of C++ to Parallel Systems," retrieved at <<http://ieeexplore.ieee.org/stamp/stamp.jsp?tp=&arnumber=647233&userType=inst >>, Proceedings of the Sixth Euromicro Workshop on Distributed Processing, 1998, pp. 453-459.

International Search Report and Written Opinion for International Application No. PCT/US2011/053006 (corresponding to U.S. Appl. No. 12/900,705), mailed on Mar. 20, 2012, 10 pages.

(56) References Cited

OTHER PUBLICATIONS

Polychronopoulos, Constantine D., "The Hierarchical. Task Graph and its Use in Auto-Scheduling," retrieved at <<http://www.daimi.au.dk/~u040896/temp/Speciale/p252-polychronopoulos.pdf>, Proceedings of the 5th International Conference on Supercomputing, 1991, pp. 252-263.

Paulson, Lawrence, "A Semantics-Directed. Compiler Generator," retrieved at <<www.cl.cam.ac.uk/~lp15/papers/Reports/popl82.pdf>>, Proceedings of the 9th ACM SIGPLAN-SIGACT Symposium on Principles of Programming Languages, 1982, pp. 224-233.

Office Action for U.S. Appl. No. 12/900,696 mailed Aug. 19, 2013 (16 pgs.).

Final Office Action for U.S. Appl. No. 12/900,696 mailed Dec. 5, 2013 (14 pgs.).

Applicant-Initiated Interview Summary for U.S. Appl. No. 12/900,696 mailed Mar. 24, 2014 (3 pgs.).

Office Action for U.S. Appl. No. 12/900,696 mailed Jun. 19, 2014 (16 pgs.).

Final Office Action for U.S. Appl. No. 12/900,696 mailed Oct. 29, 2014 (17 pgs.).

Office Action for U.S. Appl. No. 12/900,705 mailed Jan. 25, 2013 (35 pgs.).

Dotsenko et al., "A Multi-platform Co-Array Fortran Compiler," Pact, 2004, 12 pgs.

Gasper et al., "Automatic Parallelization of Sequential C Code," Midwest Instruction and Computing Symposium, Duluth, MN, 2003, 11 pgs.

Wang et al., "XCLONER: An Interactive Multiplatform Parallel Image Processing Development Environment," IEEE, 1992, 9 pgs.

Final Office Action for U.S. Appl. No. 12/900,705 mailed Aug. 15, 2013 (33 pgs.).

Office Action for U.S. Appl. No. 12/900,705 mailed May 7, 2014 (37 pgs.).

Final Office Action for U.S. Appl. No. 12/900,705 mailed Dec. 4, 2014 (20 pgs.).

Notice on the First Office Action for Application No. 201110314213.8 dispatched Oct. 18, 2013 (3 pgs.).

International Preliminary Report on Patentability for International Application No. PCT/US2011/053006 mailed Apr. 18, 2013 (7 pgs).

Office Action for U.S. Appl. No. 12/900,708 mailed Oct. 11, 2013 (36 pgs.).

Czarnecki et al., "DSL Implementation in MetaOCaml, Template Haskell, and C++," Springer-Verlag, 2004, 22 pgs.

Falcou et al., "QUAFF: efficient C++ design for parallel skeletons," Elsevier, 2006, 12 pgs.

Kerr, Kenny, "C++: The Most Powerful Language for .NET Framework Programming," Microsoft, 2004, 21 pgs.

Stichnoth et al., "Code Composition as an Implementation Language for Compilers," USENIX, 1997, 15 pgs.

Striegnitz et al., "An Expression Template aware Lambda Function," CiteSeer, 2000, 14 pgs.

Veldhuizen, Todd, "C++ Templates as Partial Evaluation," 1998, 13 pgs.

Final Office Action for U.S. Appl. No. 12/900,708 mailed May 22, 2014 (36 pgs.).

Office Action for U.S. Appl. No. 12/900,708 mailed Sep. 12, 2014 (26 pgs.).

Office Action for U.S. Appl. No. 12/900,696 mailed Apr. 7, 2015 (27 pgs.).

Final Office Action for U.S. Appl. No. 12/900,705 mailed Jan. 13, 2016 (19 pgs.).

Final Office Action for U.S. Appl. No. 12/900,696 mailed Oct. 8, 2015 (22 pgs.).

Office Action for U.S. Appl. No. 12/900,705 mailed Jul. 7, 2015 (27 pgs.).

Final Office Action for U.S. Appl. No. 12/900,708 mailed May 28, 2015 (32 pgs.).

Office Action for U.S. Appl. No. 12/900,708 mailed Oct. 7, 2015 (28 pgs.).

Office Action for U.S. Appl. No. 12/900,696 mailed Jun. 9, 2016 (24 pgs.).

Office Action for U.S. Appl. No. 12/900,705 mailed Jun. 30, 2016 (28 pgs.).

Final Office Action for U.S. Appl. No. 12/900,708 mailed May 10, 2016 (32 pgs.).

Notice of Allowance for U.S. Appl. No. 12/900,696 mailed Nov. 4, 2016 (9 pgs.).

Notice of Allowance for U.S. Appl. No. 12/900,705 mailed Jan. 20, 2017 (13 pgs.).

"New Common Knowledge at Era of Multi-Core: Usage of CPU", Software Design, Gijutsu-Hyohron Co., Ltd., vol. 225, Jul. 18, 2009, pp. 84-91.

Notice of Allowance for U.S. Appl. No. 12/900,708 mailed Nov. 3, 2016 (13 pgs.).

```
int main(int argc, char * argv[])
{
    Dag * dag = CreateDag(argc, argv); }404 auto reader = continue_when(dag->Begin(), []() -> std::vector<int>
    {
        // Create the input vector
        std::vector<int> v;
        for (int i = 0; i < N; i++) v.push_back(N-i);
        return v;
    });              428                              430
    auto sort1 = continue_when(reader, [](const std::vector<int>& data)
    -> std::vector<int>
                     432
    {
        // Sort the first half
        std::vector<int> v(data.begin(), (data.begin() + data.size()/2));
        std::sort(v.begin(), v.end());
        return v;
    });

auto sort2 = continue_when(reader, [](const std::vector<int>& data)
    -> std::vector<int>
    {
        // Sort the second half
        std::vector<int> v((data.begin() + data.size()/2), data.end());
        std::sort(v.begin(), v.end());
        return v;
    });

continue_when(sort1, sort2, [](const vector<int>& v1,
    const vector<int>& v2)-> vector<int>
    {
        // Merge the two sorted vectors
        std::vector<int> v;
        std::merge(v1.begin(), v1.end(), v2.begin(), v2.end(), v.begin());
        return v;
    });

// Execute the DAG  }414
    dag->Run();

DestroyDag(dag); }416
    return 0;
}
```

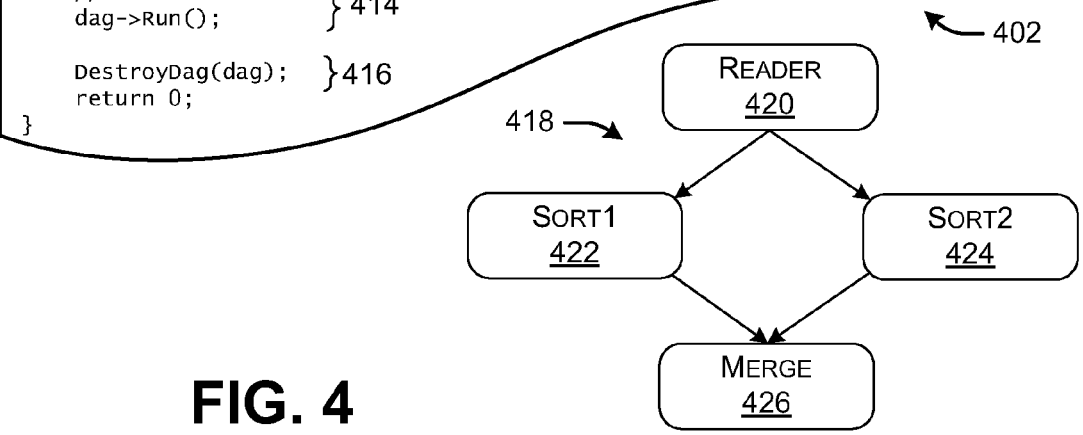

FIG. 4

VERIFICATION OF A DATAFLOW
REPRESENTATION OF A PROGRAM
THROUGH STATIC TYPE-CHECKING

BACKGROUND

Technology exists for partitioning a program into components and distributing those components to the computing resources of an execution environment. For example, the execution environment may include a collection of processing cores associated with a single computing device, or a collection of servers associated with a computing cluster, and so on. The computing resources that are invoked can then execute the components in distributed and parallel fashion. This technology may expedite the execution of the user program, especially in those scenarios in which the program involves the processing of a large amount of data.

However, the above-described execution approach complicates the execution of a program. This added complexity, in turn, may lead to errors in the execution of the program which are difficult to identify and fix. Among other possible negative consequences, such runtime errors are "expensive" because they waste computer resources; further, the errors may require substantial debugging effort to correct.

SUMMARY

Functionality is described for providing a compiled program that can be executed in a parallel and a distributed manner by a selected runtime environment. The functionality includes a compiler module for producing the compiled program based on a dataflow representation of a user program (referred to herein as a "dataflow-expressed program" for brevity). The dataflow-expressed program, in turn, includes a plurality of tasks that are connected together in a manner specified by a graph (such as a directed acyclic graph). Each task has at least one input associated with a specified type and an output associated with a specified type. As part of its processing, the compiler module operates by performing static type-checking on the dataflow-expressed program to identify the presence of any mismatch errors in the dataflow-expressed program. By virtue of this approach, the above-described functionality can identify any mismatch errors in constructing the graph prior to its instantiation and execution in a runtime environment, thereby reducing or eliminating the occurrence of the above-described types of expensive runtime failures.

According to one illustrative aspect, the static type-checking can involve, for each task, determining whether a type associated with each input matches an expected input type. The static type-checking can also involve determining whether a number of inputs matches an expected number of inputs.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows an example of a dataflow-expressed program.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality for producing a compiled program that can be executed in a parallel and a distributed manner by a runtime environment, where that runtime environment is selected from a plurality of candidate runtime environments. The process for producing the compiled program involves performing static type-checking to verify that tasks specified in the program are connected together in a permitted manner. Section B describes one illustrative manner of operation of the functionality of Section A in flowchart form. Section C describes illustrative processing functionality that can be used to implement any aspect of the features described in Sections A and B.

The subject matter described herein is related to the following copending applications: a) application Ser. No. 12/900,705, entitled "RUNTIME AGNOSTIC REPRESENTATION OF USER CODE FOR EXECUTION WITH SELECTED EXECUTION RUNTIME"; b) application Ser. No. 12/900,696, entitled "DYNAMIC DATA AND COMPUTE RESOURCE ELASTICITY"; and c) application Ser. No. 12/900,708, entitled "DECLARATIVE PROGRAMMING MODEL WITH A NATIVE PROGRAMMING LANGUAGE." All three applications name the inventors of Krishnan Varadarajan and Michael L. Chu, and all three applications were filed on Oct. 8, 2010. All three applications are incorporated by reference herein in their respective entireties.

Figure 12:
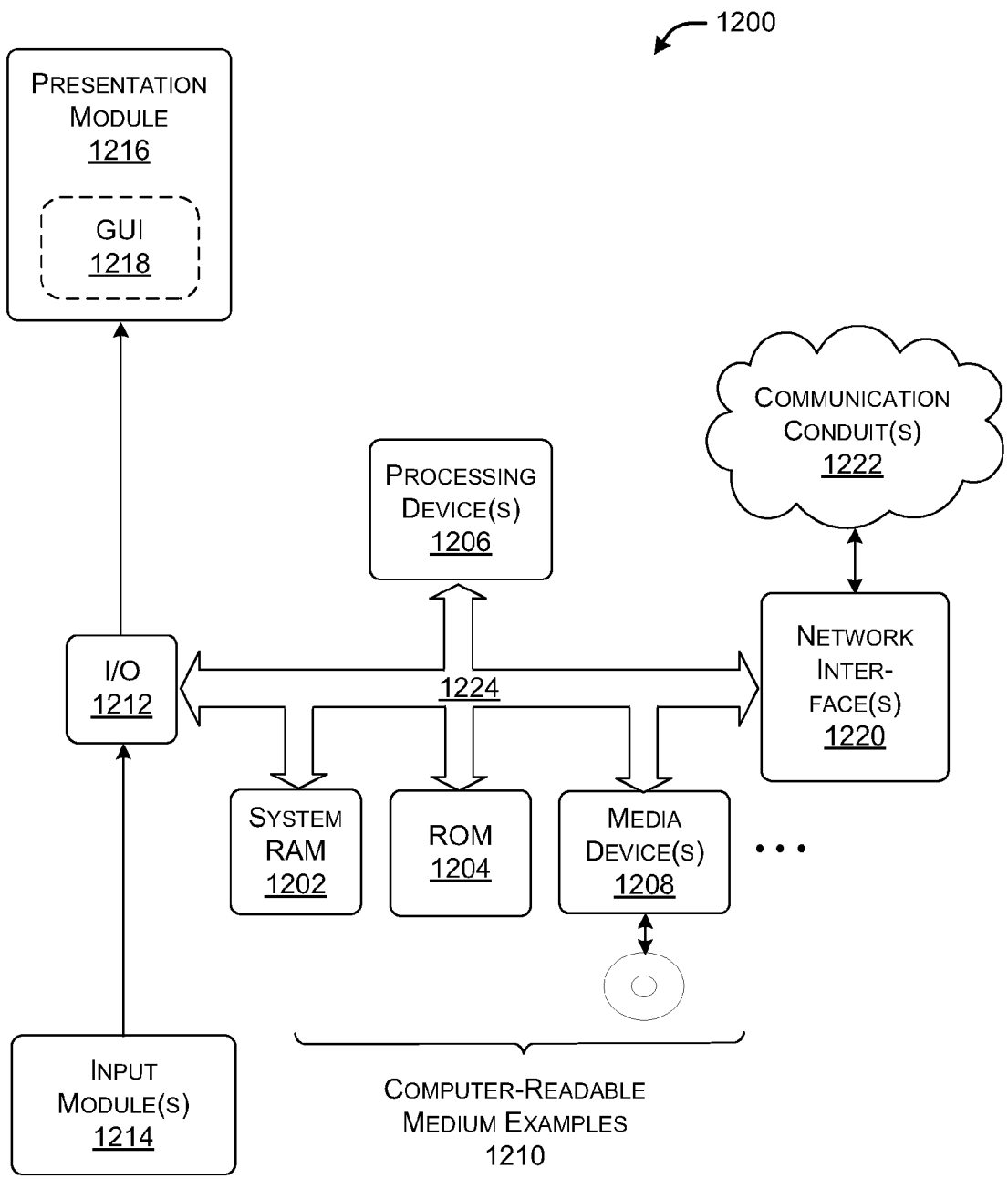
FIG. 12 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 12, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Functionality

Figure 1:
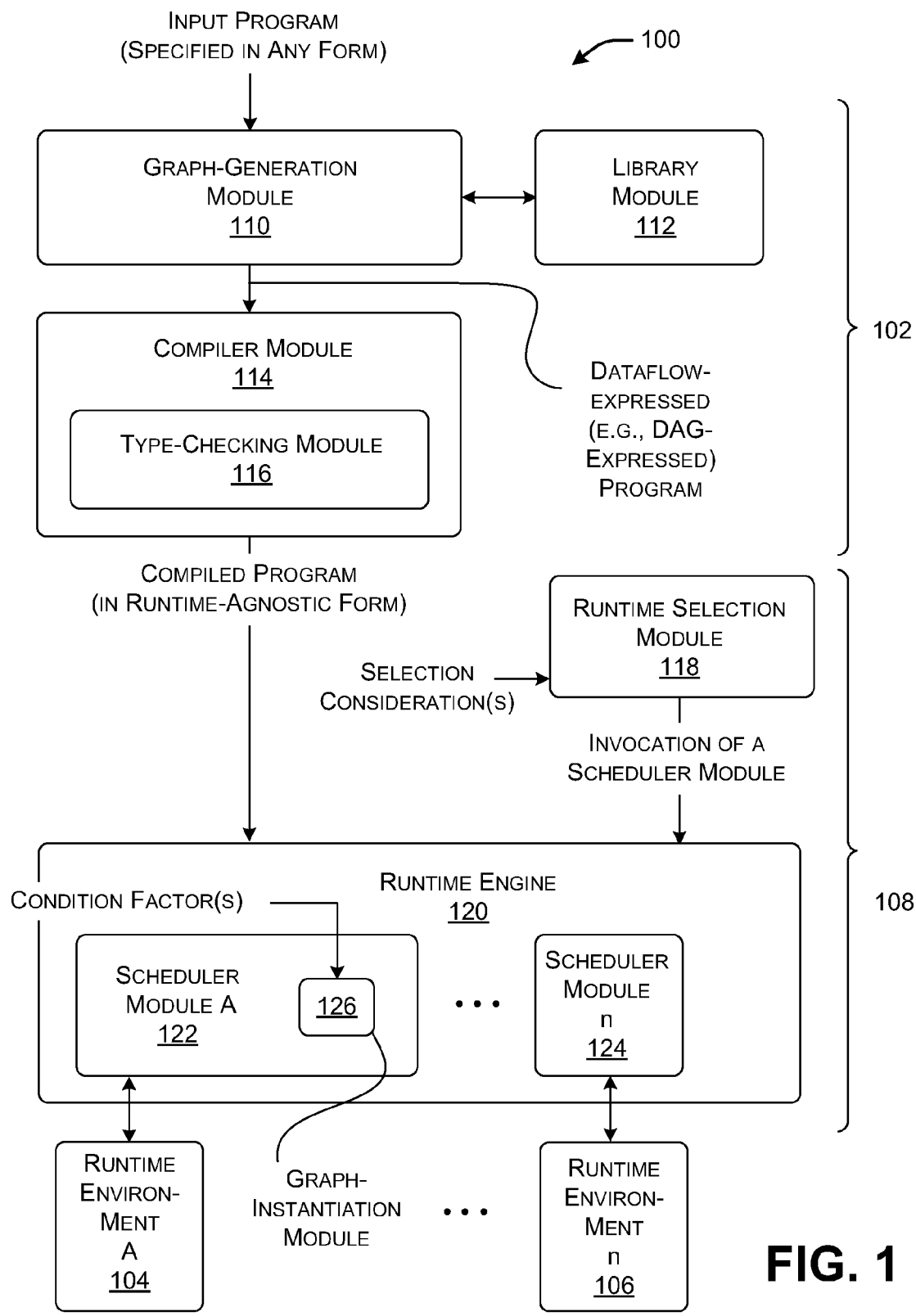
FIG. 1 shows an illustrative environment for compiling a user program to produce a compiled program, and for executing the compiled program in a potentially parallel and distributed manner

FIG. 1 shows an environment 100 which represents one implementation of the features described herein. The environment 100 can be conceptualized as including two domains of functionality, compilation functionality and runtime functionality. Namely, compilation functionality 102 is used to provide a compiled program. That compiled program is expressed in an agnostic form that can be executed on any runtime environment selected from among a plurality of candidate runtime environments (104, . . . 106). Each runtime environment, in turn, can provide a plurality of computing resources for implementing the compiled program in a parallel and distributed manner. The environment 100 also includes runtime functionality 108 for executing the compiled program in the context of the selected runtime environment.

The compilation functionality 102 can be implemented in any manner. For example, the compilation functionality 102 can be implemented by one or more computing devices of any type, such as one or more personal computers, one or more computer workstations, etc. The runtime functionality 108 can likewise be implemented in any manner, such as by one or more computing devices of any type. In one case, the compilation functionality 102 is separate and distinct from the runtime functionality 108. In another case, there is at least a partial overlap between the equipment used to implement the compilation functionality 102 and the equipment used to implement runtime functionality 108.

This section describes the operation of the environment 100 of FIG. 1, generally from top to bottom, with emphasis (in Subsection A.2) on static-type checking performed by the compilation functionality 102. At the outset, it is pointed out that the environment 100 shown in FIG. 1 is just one system-related context in which static type-checking of dataflow-expressed programs can be performed. The static type-checking can also be performed in other system-related contexts that may differ from the environment 100 shown in FIG. 1 in any manner.

A.1. Overview of the Environment

The compilation functionality 102 can include, or can be conceptualized to include, a graph-generation module 110. The graph-generation module 110 receives an input program that is expressed in any original form. The graph-generation module 110 then converts the input program into a program that is represented in terms of a dataflow of tasks (if in fact, the input program is not already expressed in this format). In the terminology used herein, the graph-generation module 110 is said to generate a dataflow-expressed program. To provide this service, the graph-generation module 110 can rely on resources provided by a library module 112. For example, the library module 112 can provide application programming interface (API) modules that can be referenced by the dataflow-expressed program. The below-explanation provides additional details regarding the operation of the graph-generation module 110 and the construction of an illustrative dataflow-expressed program.

A compiler module 114 then converts the dataflow-expressed program into a compiled program, e.g., by converting the instructions in the dataflow-expressed program into a binary form that is executable by one of the runtime environments (104, . . . 106). The compiler module 114 also includes a type-checking module 116. From a high-level standpoint, the type-checking module 116 examines tasks identified in the dataflow-expressed program. The type-checking module 116 ensures that the tasks are connected together in an appropriate manner so that the compiled program will not produce runtime errors when it is executed. Subsection A.2 provides additional illustrative details regarding the operation of the type-checking module 116.

Now referring to the runtime functionality 108, a runtime selection module 118 can optional receive information with respect to one or more selection considerations. Based thereon, the runtime selection module 118 can choose a runtime environment that is deemed appropriate to execute the compiled program. For example, the selection considerations can include any of: a) information regarding the characteristics of the compiled program; b) information regarding an amount of data that is to be processed by the compiled program; c) information regarding the amounts (and kinds) of computing resources that are available to run the compiled program; d) information regarding the express processing instructions identified by a user (or other agent), and so on.

A runtime engine 120 includes a plurality of scheduler modules (e.g., 122, . . . 124) that can be used to execute the compiled program in respective runtime environments. For example, scheduler module A 122 can be invoked to control the execution of the compiled program in runtime environment A 104. Scheduler module n 124 can be invoked to control the execution of the compiled program in runtime environment n 106, and so on.

Each scheduler module can include a graph instantiation module, such as graph instantiation module 126 used by scheduler module A 122. The scheduler module A 122 calls on the graph instantiation module 126 when it is ready to execute a particular work item (e.g., a particular task) specified in the compiled program. In response, the graph instantiation module 126 receives and evaluates information regarding one or more condition factors. Based thereon, the graph instantiation module 126 determines an appropriate instantiation of the work item. The condition factors can correspond to any of the information items identified above (with respect to the selection factors), such as information regarding the amount of data that is expected to be processed by the work item, information regarding the amounts and kinds of available computing resources, and so on. Again, the explanation below provides additional illustrative details regarding the operation of any scheduler module.

Figure 2:
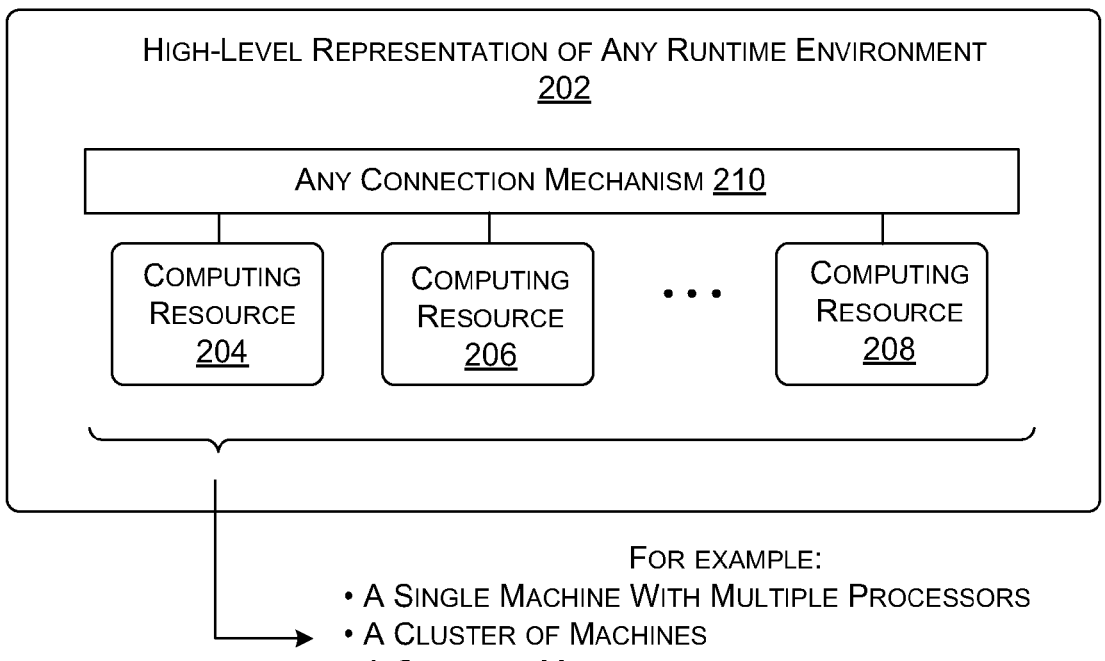
FIG. 2 shows a high-level representation of an execution environment that can be used to execute a compiled program.

Advancing to FIG. 2, this figure shows a high-level representation of any runtime environment 202. Generally stated, the runtime environment 202 includes a plurality of computing resources (204, 206, . . . 208). The computing resources (204, 206, . . . 208) can refer to any combination of processing resources, storage resources, bandwidth-related resources, and so on. The computing resources (204, 206, . . . 208) can be coupled together in any manner, e.g., via point-to-point connections, via a local area network, via a wide area network (e.g., the Internet), via a peer-to-peer network, and so on. Connection mechanism 210 generally represents any such means of connecting the computing resources (204, 206, . . . 208) together.

For example, in one scenario, the runtime environment 202 corresponds to a single computing machine. In that context, the plural computing resources (204, 206, . . . 208) can correspond to plural central processing cores (e.g., plural CPUs), plural graphics processing units (GPUs), etc. In a second scenario, the runtime environment 202 corresponds to a cluster of computing machines. Here, the plural computing resources (204, 206, . . . 208) correspond to the plural computing machines and/or other processing resources, which can be located at the same site or distributed over plural sites. In a third scenario, the runtime environment 202 corresponds to a more encompassing cloud of computing machines. Here, the plural computing resources (204, 206, . . . 208) correspond to the plural computing machines and/or other processing resources, which can be located at the same site or distributed over plural sites. These scenarios are representative rather than exhaustive; that is, the principles described herein can be implemented in the context of other runtime environments.

Figure 3:
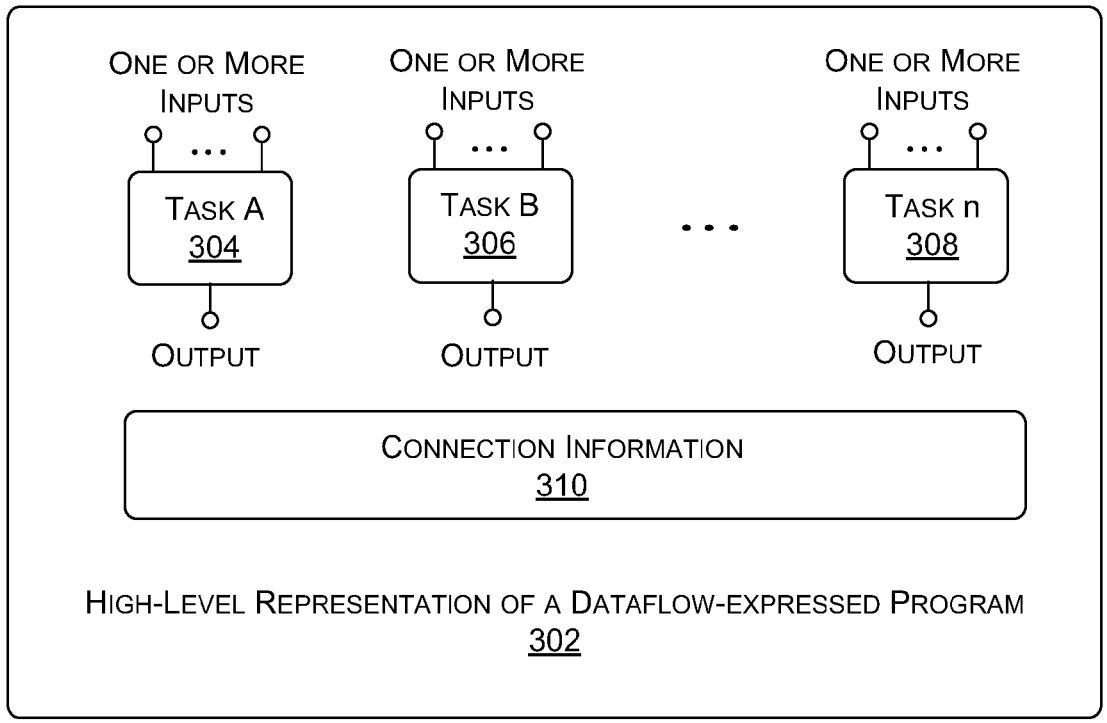
FIG. 3 shows a high-level representation of a dataflow-expressed program that includes a plurality of tasks.

FIG. 3 shows a high-level representation of a dataflow-expressed program 302. In one example, the dataflow-expressed program 302 can specify one or more tasks (304, 306, . . . 308) that perform respective functions. Each task can receive one or more inputs, perform some function on the input(s), and then generate an output that reflects the outcome of its processing. The dataflow-expressed program 302 can also include connection information 310 which expresses the connection among the tasks. The output of any task can be fed as input to one or more other tasks. The connection of the tasks (304, 306, . . . 308), as defined by the connection information 310, defines a graph, such a directed acyclic graph (DAG).

In one implementation, the tasks (304, 306, . . . 308) are side-effect free. Further, the tasks (304, 306, . . . 308) do not share data. This means that the tasks (304, 306, . . . 308) are self-contained units. And as such, the processing of one task does not affect the processing of another task, except insofar as the outcome of some tasks may feed into other tasks as input. In addition, the environment 100 as a whole is configured to accommodate the lazy execution of the tasks (304, 306, . . . 308). This means that the runtime environment can execute the tasks when (and if) there is a demand to execute the tasks, and not before.

The dataflow-expressed program 302 as a whole can perform any function, and can be expressed in any programming language. For example, the dataflow-expressed program 302 can represent a high-level application that performs any function, a component of an operating system, and so on.

FIG. 4 shows an example of one particular dataflow-expressed program 402. From a high-level perspective, the dataflow-expressed program is structured as follows. First, the dataflow-expressed program 402 includes an instruction 404 to invoke an appropriate scheduler module to execute a graph defined by the dataflow-expressed program 402. In the context of FIG. 1, the runtime selection module 118 represents the functionality which carries out the instruction 404. The dataflow-expressed program also includes task objects (e.g., task objects 406, 408, 410, and 412) which define respective tasks. The dataflow-expressed program 402 populates the nodes in the graph based on the task objects. The dataflow-expressed program 402 also includes an instruction 414 that invokes the execution of the tasks in the graph. Finally, the dataflow-expressed program 402 can include an instruction 416 to delete the graph once the dataflow-expressed program 402 has been executed. To repeat, the dataflow-expressed program 402 is one way among many to formulate a dataflow-type program.

FIG. 4 also shows a graphical representation 418 of the graph defined by the dataflow-expressed program 402. The vertices (nodes) in the graph represent actions to be performed. The edges that connect the vertices represent the functional coupling among tasks. In other words, the edges represent data that flows among the tasks. In this particular example, the dataflow-expressed program includes a reader node 420 for supplying data to be sorted. The reader node 420 is instantiated based on a reader task object 406. Two sort nodes (e.g., sort node 422 and sort node 424) receive input data from the reader node 420. In response, each sort node performs a sorting function to provide sorted output data. The sort nodes (422, 424) are instantiated based on sort task objects (408, 410). A merge node 426 receives the input data from the two sort nodes (422, 424). In response, the merge node 426 performs a merge function on the input data to generate merged output data. The merge node 426 is instantiated based on a merge task object 412.

In this example, a scheduler associated with a particular runtime environment can execute the tasks associated with each sort node (422, 424) when the appropriate input data is supplied to these nodes (422, 424) by the reader node 420. And the merge node 426 can perform its function when it receives the outputs provided by both sort nodes (422, 424). In this particular example, the scheduler can allocate the tasks associated with each sort node (422, 424) to two different computing resources; the two sort tasks can then be performed in a parallel and distributed fashion.

In one particular implementation, each task object is constructed as a wrapper that encapsulates a function. For example, consider the case of the first sort task object 408. The task object 408 identifies an application programming interface (API) 428, labeled as "continue when." The library module 112 provides the code for such an API 428 (along with all other APIs). From a functional respective, the act of calling the API 428 establishes the sort node 422 in the graph; that node receives input from the reader node 420 and provides output for consumption by the merge node 426.

The function associated with a task can be expressed in any manner. In one particular example, the dataflow-expressed program 402 can be expressed as a C++ program. In this context, the dataflow-expressed program 402 can express a task's function as a C++ Lambda function, which may contain sequential code Further note that each task object specifies the input(s) associated with each task object, as well as the output associated with each task object. Moreover, each task object specifies the type of each respective input and the type of the output. For example, consider the first sort task object 408. In code element 430, this task object 408 specifies that the task receives a single input having a type "std::vector<int>" (for a vector of integers). In code element 432, this task object 408 also specifies that the task provides a single output having a type "std::vector<int>." Generally, in a typed system, the type of a data item specifies the manner in which the data item is to be interpreted by a computer system. Due to the type information provided by each task object in FIG. 2, the task objects can be said to be strongly typed. As will be set forth in Subsection A.2, the type-checking module 116 can leverage type information specified for each task object to ensure that the tasks are connected together in an appropriate manner.

In one implementation, the graph-generation module 110 (of FIG. 1) can provide an original input program in a form that already embodies the type of graph content shown in FIG. 4. In this case, the graph-generation module 110 produces the dataflow-expressed program by appropriately integrating the user program with the API (and/or other) resources provided in the library module 112.

In another implementation, the graph-generation module 110 can provide an original input program in some other form that may not fully embody the type of graph content shown in FIG. 4. In this case, the graph-generation module 110 can translate the original input program into the form specified in FIG. 4 (or into another appropriate dataflow form). For example, in one scenario, the graph-generation module 110 can receive an input program expressed in a declarative query syntax, such as the query syntax expressed in copending application Ser. No. 12/900,708, entitled "DECLARATIVE PROGRAMMING MODEL WITH A NATIVE PROGRAMMING LANGUAGE." The queries in that case are not integrated with the underlying native programming language, but rather may be expressed using a method-based invocation strategy. The graph-generation module 110 can then map or translate the query syntax into the form specified in FIG. 4 (or into another appropriate data flow form).

Figure 5:
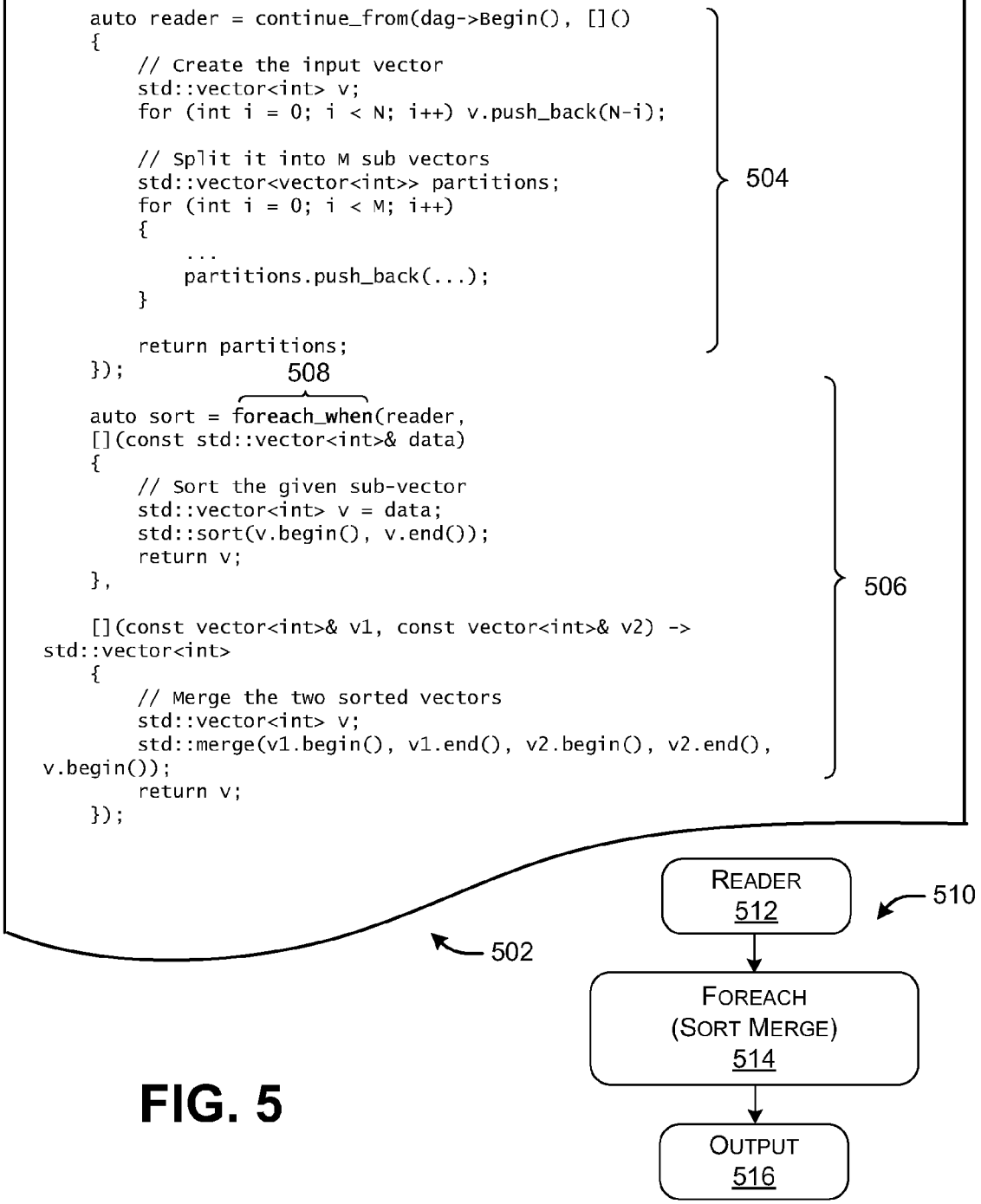
FIG. 5 shows another example of a dataflow-expressed program. This dataflow-expressed program accommodates elastic instantiation of the tasks specified therein during the execution of the program.

FIG. 5 shows another example of a dataflow-expressed program 502. This dataflow-expressed program 502 performs the same functions as the dataflow-expressed program 402 of FIG. 4. But the dataflow-expressed program 502 of FIG. 5 is constructed in a different manner to more efficiently take advantage of dynamically-changing resources provided in a runtime environment.

More specifically, the dataflow-expressed program 502 includes a reader task object 504 that performs a reader function; in this case, the reader function also generates data partitions in an appropriate manner. The dataflow-expressed program 502 also includes a sort-merge task object 506 that performs a sorting and merging operation with respect to a particular data partition. The sort-merge task object 506 is implemented using an API 508 labeled "foreach_when." FIG. 5 also shows a graphical representation 510 of the tasks specified in the dataflow-expressed program 502. Namely, the graph includes a reader node 512 for performing a reader function, a sort-merge node 514 for performing a sorting and merging operation, and an output node 516 for outputting a final result provided by a final merge operation.

In the examples above, the dataflow-expressed program represents a generic program that can be implemented by any runtime environment selected from a plurality of possible candidate runtime environments. In other words, the dataflow-expressed program is not particularly constructed to accommodate the features found in any particular runtime environment, and can therefore be said to be agnostic with respect to the features provided by the available runtime environments. This characteristic provides good user experience, as a user can generate a single user program without taking into consideration the particular strengths and constraints of a target runtime environment. Furthermore, this characteristic expands the applicability of any program developed by the user.

Figure 6:
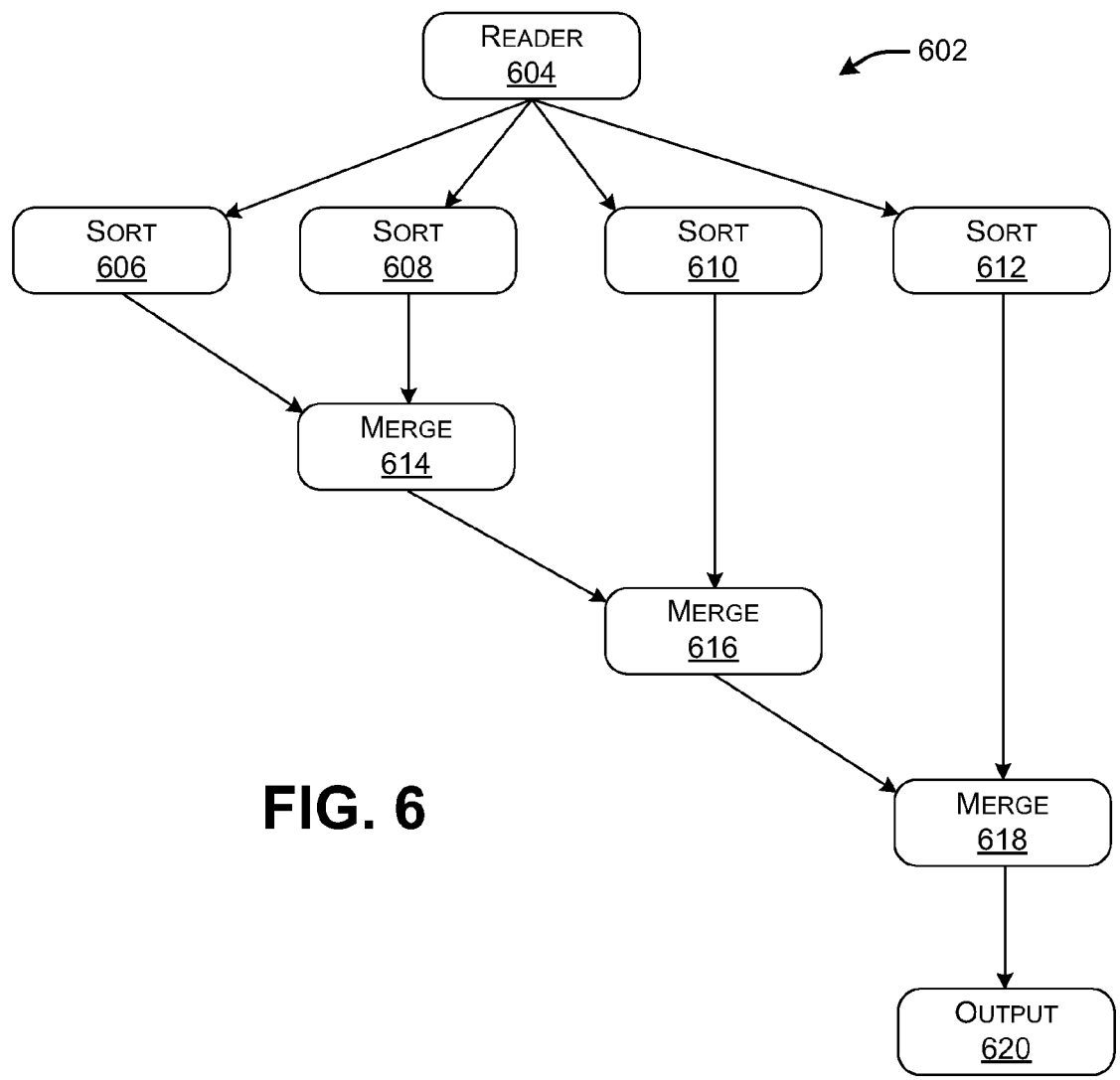
FIG. 6 shows one particular runtime instantiation of the dataflow-expressed program of FIG. 5.

FIG. 6 illustrates the manner in which a selected scheduler module can instantiate the general dataflow-expressed program shown in FIG. 5 for a particular runtime environment. As explained above, the scheduler module can determine the manner in which each work item (e.g., each task) is to be instantiated at the time that it is ready to execute the work item (e.g., when all the data for that task has been received). The scheduler module can determine how to instantiate each work item based on the condition factors identified above, including: a) manually-supplied heuristic information; b) information regarding the amount of data that is to be processed by the work item; and c) information regarding the amounts (and kinds) of computing resources that are currently available to handle the work item.

In the merely illustrative case of FIG. 6, a graph instantiation 602 includes a single reader node 604 for implementing the reader task. The scheduler module chooses four sort nodes (606, 608, 610, 612) and three merge nodes (614, 616, 618) for implementing separate instances of the sort-merge task. And the scheduler module chooses a single output node 620 for generates a final output provided by the merge node 618. In this manner, the scheduler module can scale the manner in which the compiled program is executed based on the condition factors identified above.

A.2. Static-Type-Checking Functionality

As explained in Subsection A.1, the compiler module 114 includes a type-checking module 116 that verifies the integrity of the dataflow-expressed program. From a general standpoint, the type-checking module 116 performs checking to statically verify dataflow connections in the graph represented by the dataflow-expressed program. That is, this checking ensures that the nodes of the graph connect together in a permitted manner.

Figure 7:
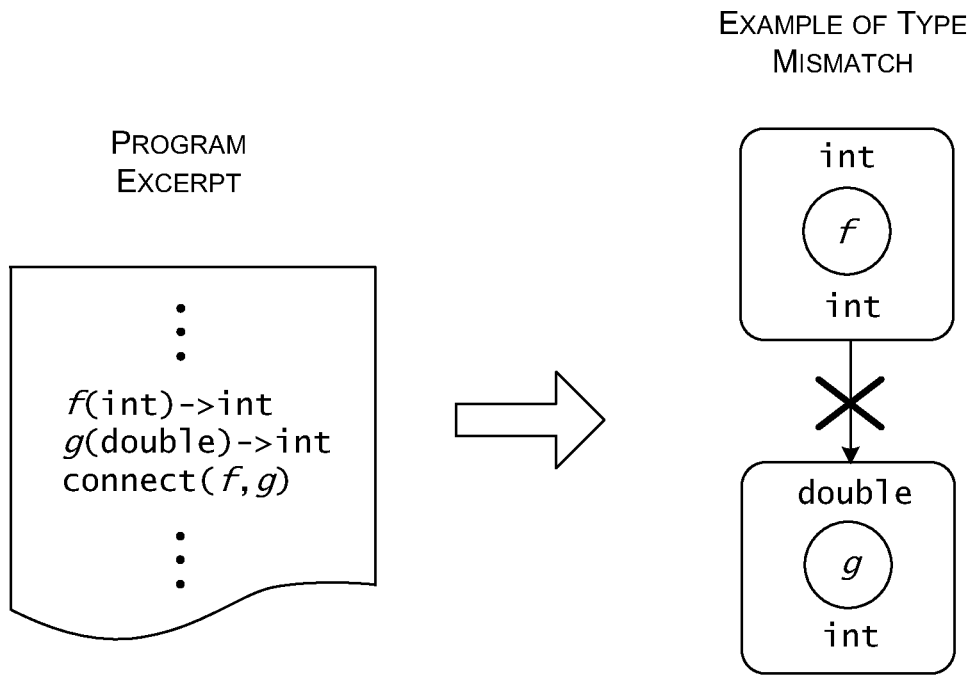
FIGS. 7 and 8 shows examples of static type-checking that can be performed in the course of the compilation of a dataflow-expressed program.
Figure 8:
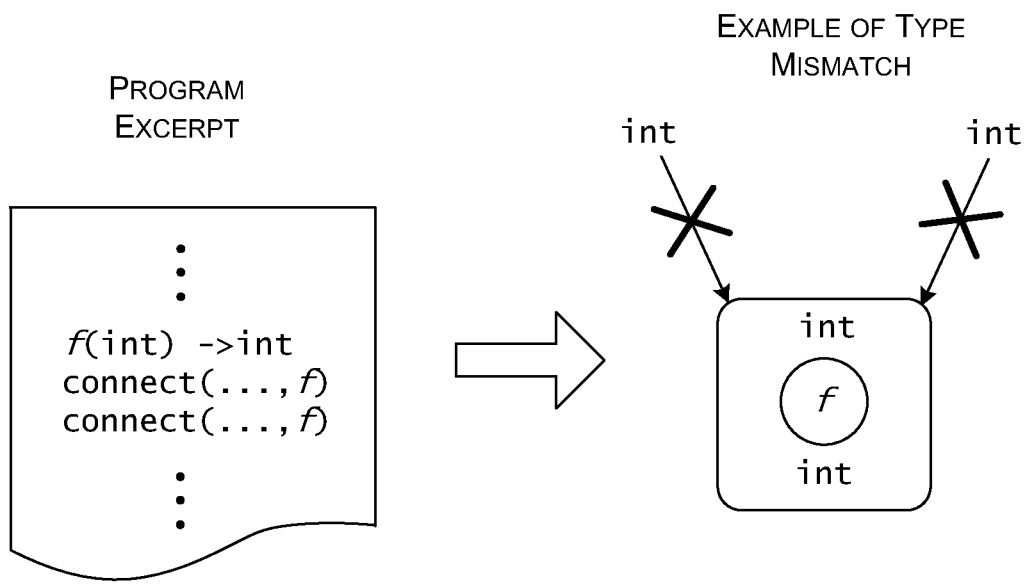

More specifically, the type-checking module 116 can perform at least the kinds of type-checking operations shown in FIGS. 7 and 8. In the example of FIG. 7, assume that, as part thereof, a dataflow-expressed program specifies a first task that performs function $f$ and a second task that performs function g. The function $f$ receives an input of type "int" and supplies an output of type "int." The function g receives an input of type "double" and supplies an output of type "int." The dataflow-expressed program also include appropriate connection information which specifies that the first task is coupled to the second task, such that the first task supplies input data to the second task.

The type-checking module 116 will identify this connection as erroneous. This is because the second task is expecting an input that has the type "double." Yet the first task provides an input of type "int." In other words, there is an incongruity between the type of input expected by the second task and the type of input that is actually supplied to the second task.

In the example of FIG. 8, assume that, as part thereof, a dataflow-expressed program specifies a task $f$ that receives a single input of type "int." The dataflow-expressed program also includes appropriate connection information which specifies that two sources will provide input to the function ƒ. Here too, the type-checking module 116 will identify the connection as erroneous. This is because the task is expecting a single input, yet the dataflow-expressed program attempts to provide two inputs to the task. In other words, there is an incongruity between the number of inputs expected by a task and the number of inputs that are actually supplied to the task.

When applied to the example of FIG. 4, the type-checking module 116 can generate a mismatch error if any of the sort tasks do not receive the correct type of data (and/or the correct number of data items) from the reader task. Similarly, the type-checking module 116 can generate a mismatch error if the merge task does not receive the correct type of data (and/or the correct number of data items) from the sort tasks. The scenario of FIG. 4 is a simplified example. In other cases, the dataflow-expressed program can correspond to a larger graph, potentially having graph components created at different times, some of which may be obtained from a library or the like. This will increase the risk that tasks will be connected in an erroneous manner, which the type-checking module 116 can successfully detect.

It is beneficial to detect errors in the compilation stage because the errors may be easier to diagnose and fix at this stage (compared to the runtime stage). Further, it is more resource-efficient (and time-efficient) to identify errors at the compilation stage (compared to the runtime stage). For example, the deployment of a error-prone program in a cluster or cloud environment can potentially waste a significant amount of computing resources.

B. Illustrative Methods

The remaining figures show illustrative procedures and accompanying examples which explain one manner of operation of various features of the environment 100 of FIG. 1. Since one manner of operation of the environment 100 has already been explained in Section A, certain features will be set forth in summary fashion in this section.

Figure 9:
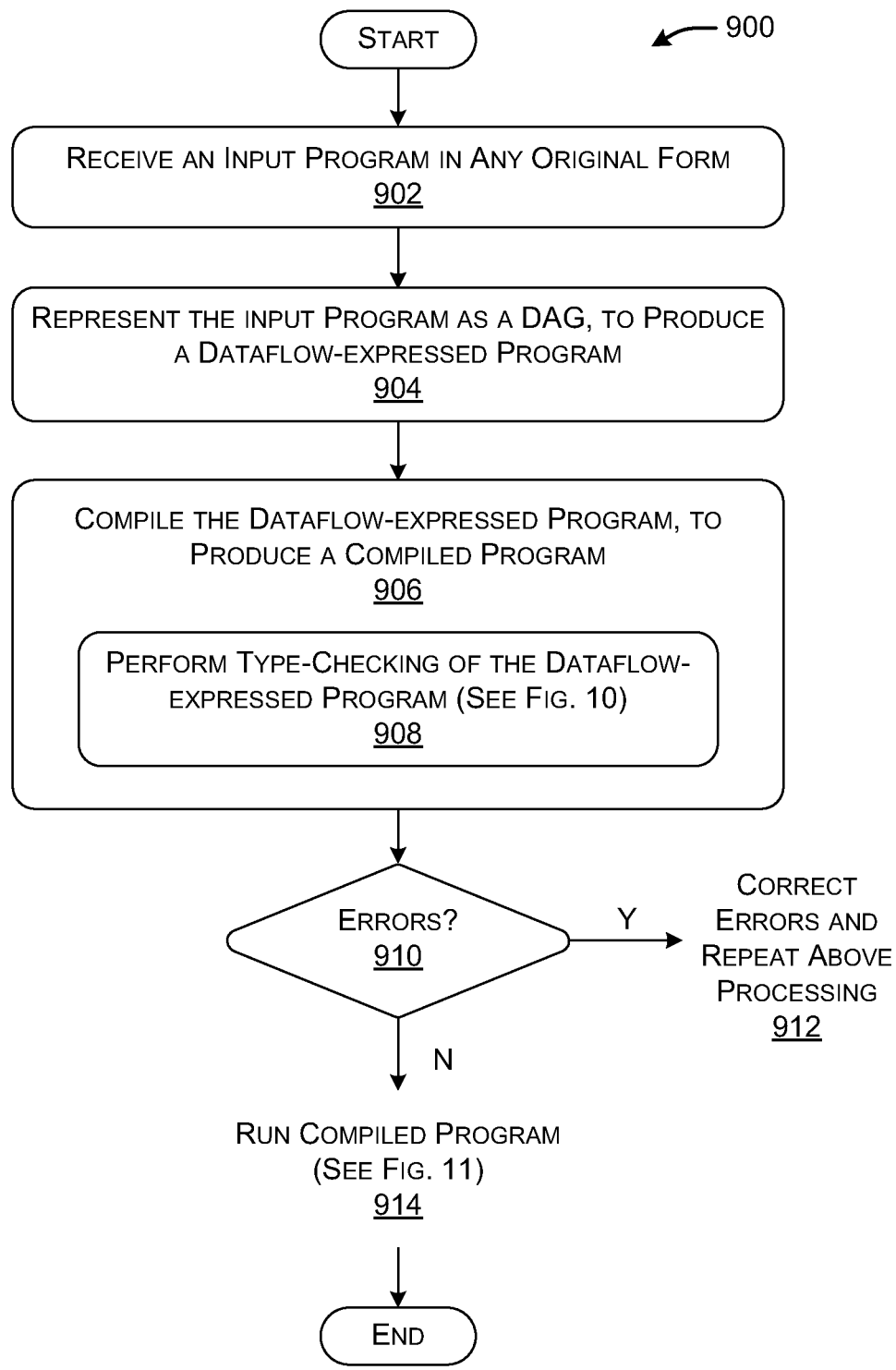
FIG. 9 is a flowchart that describes one illustrative manner for producing a compiled program.

Starting with FIG. 9, this figure shows a procedure 900 that explains one manner of operation of the compilation functionality 102 of FIG. 1. In block 902, the compilation functionality 102 receives an input program expressed in an original form. In block 904, the compilation functionality 102 represents the input program in graph form, e.g., as a dataflow-expressed program. Block 904 can represent different underlying operations depending on the form in which the input program is received. In one case, block 904 can entail translating an input program expressed in a query format to the dataflow form shown in FIG. 4 (or the like).

In block 906, the compilation functionality 102 compiles the dataflow-expressed program to produce a compiled program. The compiled program may represent a binary executable that can be run in a parallel and distributed manner on any runtime environment selected from among plural candidate runtime environments. In this sense, the compiled program can be said to be agnostic with respect to the eventual runtime environment in which the program is executed.

Figure 10:
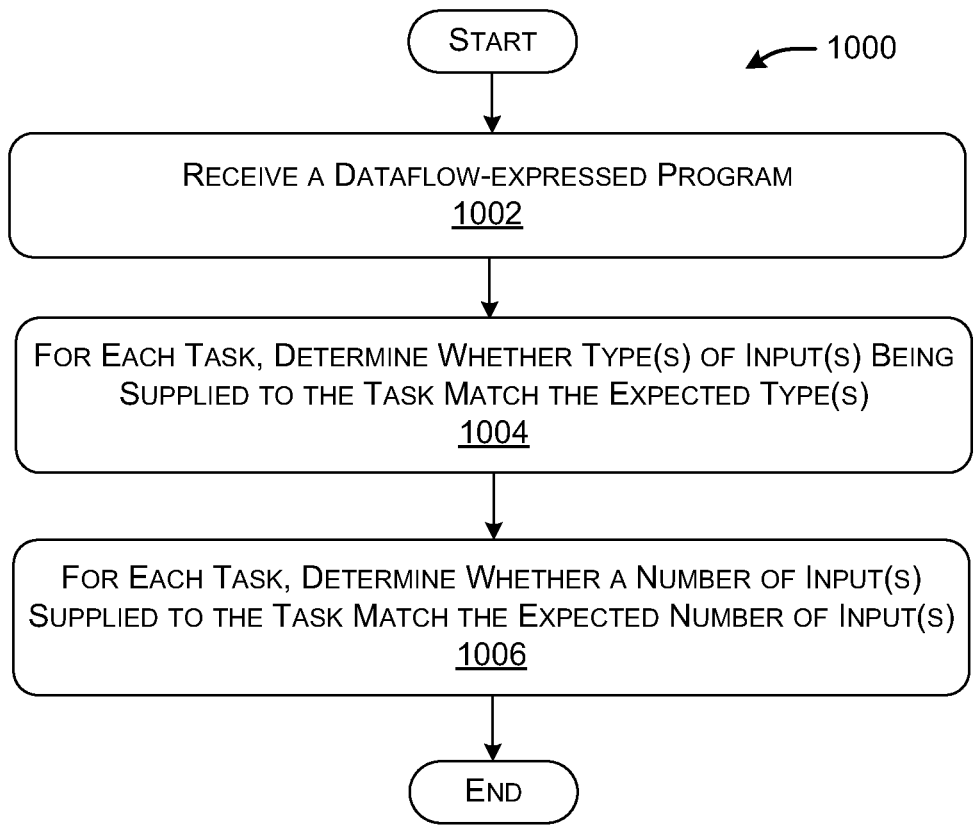
FIG. 10 is a flowchart that describes illustrative static type-checking that can be performed in the course of the procedure of FIG. 9.

As part of the compilation process, in block 908, the compilation functionality 102 can perform static type-checking on the dataflow-expressed program. FIG. 10 provides further details regarding this operation. In block 910, the compilation functionality 102 determines whether any type-checking mismatches have been discovered. If so, in block 912, a user can identify the source of the errors, correct the errors, and then repeat the operations shown in FIG. 9. Alternatively, in block 914, if there are no errors, then the environment 100 can then execute the compiled program.

FIG. 10 shows a procedure 1000 that explains one manner of operation of the type-checking module 116 of FIG. 1. In block 1002, the type-checking module 116 receives a graph-expressed program for analysis. In block 1004, the type-checking module 116 determines, for each task, whether the type(s) of input(s) being supplied to the task match the type(s) of input(s) that are expected. In block 1006, the type-checking module 116 determines, for each task, whether the number of inputs being supplied to the task match the number of inputs that are expected. The type-checking module 116 can perform yet additional types of checking to verify the integrity of the graph that is constructed by the dataflow-expressed program.

Figure 11:
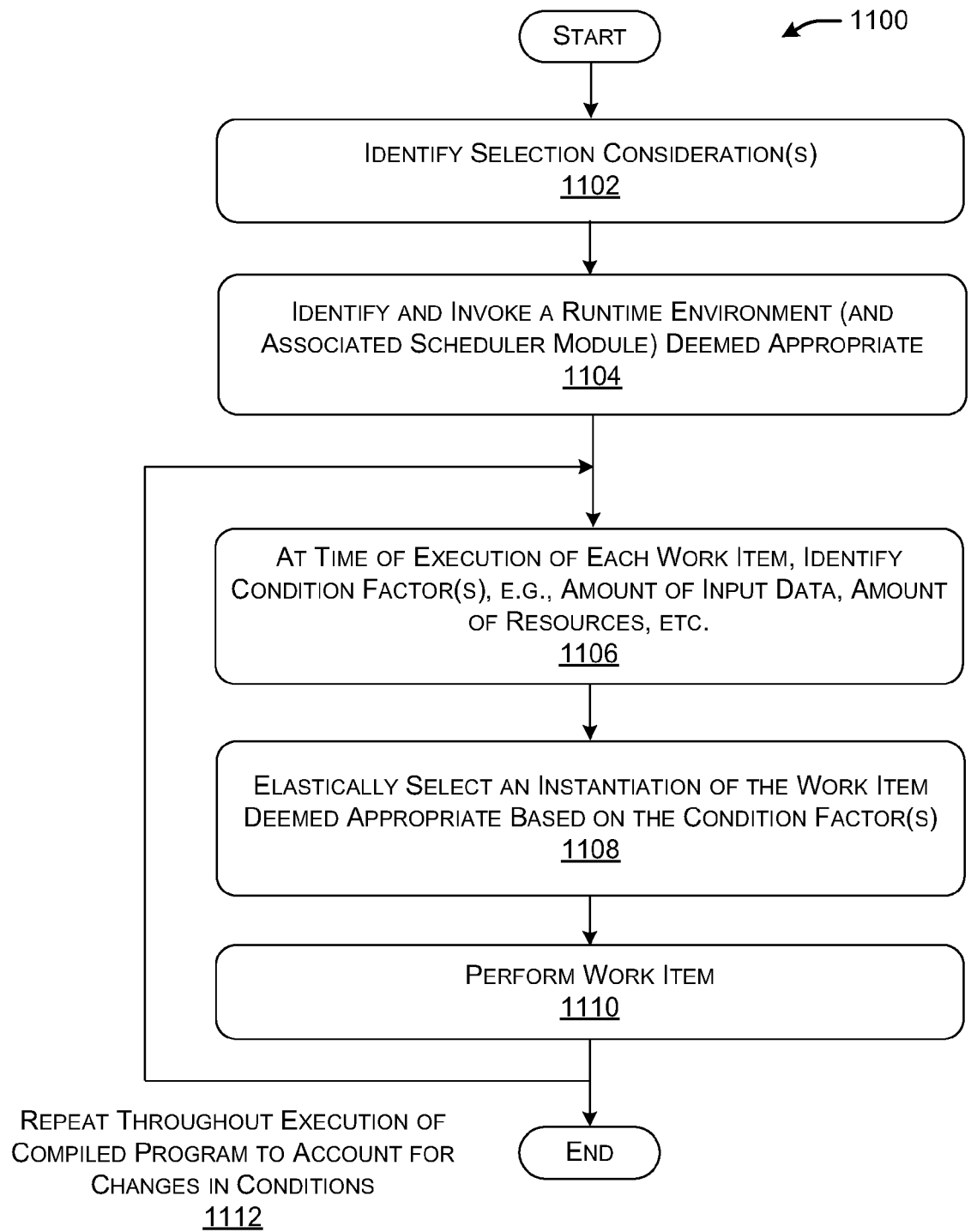
FIG. 11 is a flowchart that describes an illustrative execution of a compiled program produced by the procedure of FIG. 9.

FIG. 11 shows a procedure 1100 that explains one manner of operation of the runtime functionality 108 of FIG. 1. In block 1102, the runtime functionality 108 receives one or more selection considerations that have a bearing on the suitability of different runtime environments to process a particular compiled program. Section A identified illustrative such selection considerations. In block 1104, the runtime functionality 108 selects a runtime environment, based on the selection consideration(s), that is deemed most appropriate to process the compiled program.

In block 1106, a particular scheduler module then begins executing the compiled program, starting with a beginning node of a graph represented by the compiled program. More specifically, in block 1106, for each work item that is ready to be processed (e.g., for each task for which input data has been provided), the scheduler module identifies one or more condition factors that have a bearing on the manner in which the work item is to be instantiated by the associated runtime environment. Section A set forth illustrative such condition factors. In block 1108, the scheduler module elastically selects an instantiation of the work item that is deemed most appropriate to implement the work item. In block 1110, the scheduler module implements the work item using the selected instantiation.

Block 1112 indicates that the operations in blocks 1106, 1108, and 1110 can be repeated throughout the execution of the program, e.g., as different work items become available for execution. The dynamic allocation of work items to computing resources is beneficial because it can account for changing conditions within the runtime environment. For example, the dynamic allocation can account for changes in the amount of input data that is expected. The dynamic allocation can also account for computing resources that become enabled and/or disabled throughout the execution of the compiled program.

C. Representative Processing Functionality

FIG. 12 sets forth illustrative electrical data processing functionality 1200 (also referred to herein a computing functionality) that can be used to implement any aspect of the functions described above. For example, the processing functionality 1200 can be used to implement any aspect of the compilation functionality 102, any aspect of the runtime functionality 108, any aspect of any runtime environment, and so on. In one case, the processing functionality 1200 may correspond to any type of computing device that includes one or more processing devices. In all cases, the electrical data processing functionality 1200 represents one or more physical and tangible processing mechanisms.

The processing functionality 1200 can include volatile and non-volatile memory, such as RAM 1202 and ROM 1204, as well as one or more processing devices 1206 (e.g., one or more CPUs, and/or one or more GPUs, etc.). The processing functionality 1200 also optionally includes various media devices 1208, such as a hard disk module, an optical disk module, and so forth. The processing functionality 1200 can perform various operations identified above when the processing device(s) 1206 executes instructions that are maintained by memory (e.g., RAM 1202, ROM 1204, or elsewhere).

More generally, instructions and other information can be stored on any computer readable medium 1210, including, but not limited to, static memory storage devices, magnetic storage devices, optical storage devices, and so on. The term computer readable medium also encompasses plural storage devices. In all cases, the computer readable medium 1210 represents some form of physical and tangible mechanism.

The processing functionality 1200 also includes an input/output module 1212 for receiving various inputs (via input modules 1214), and for providing various outputs (via output modules). One particular output mechanism may include a presentation module 1216 and an associated graphical user interface (GUI) 1218. The processing functionality 1200 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area network and/or wide area network. The communication conduit(s) 1222 can include any combination of hardwired links, wireless links, routers, gateway functionality, name servers, etc., governed by any protocol or combination of protocols.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by physical computing functionality, for producing a compiled program, comprising:
   receiving a dataflow-expressed program, the dataflow-expressed program including a plurality of tasks connected together in a manner specified by a graph, each task having at least one input associated with a specified type and an output associated with a specified type; and
   in a course of compiling the dataflow-expressed program to a compiled parallel program expressed in a parallel form that is executable by any runtime environment selected from a plurality of candidate runtime environments providing a plurality of computing resources for executing the compiled program in a parallel manner, the compiled parallel program agnostic with respect to features provided by the candidate runtime environments, performing static typechecking on the dataflow-expressed program to identify presence of any mismatch errors in the dataflow-expressed program before the dataflow-expressed program instantiation and execution in the runtime environment to ensure that the nodes of the graph connect together in a permitted manner.

2. The method of claim 1, wherein the dataflow-expressed program expresses the graph as a directed acyclic graph (DAG), and wherein said performing static type-checking comprises statically verifying dataflow connections of the DAG.

3. The method of claim 1, wherein each task in the dataflow-expressed program is expressed as an object that specifies each type of each respective input, and a type of the output.

4. The method of claim 1, wherein said performing static type-checking comprises, for each task, determining whether a type associated with each input that is supplied to the task matches an expected input type.

5. The method of claim 1, wherein said performing static type-checking comprises, for each task, determining whether a number of inputs that are supplied to the task matches an expected number of inputs.

6. The method of claim 1, further comprising identifying and correcting any mismatch error that is identified, prior to executing the compiled program in a selected runtime environment.

7. The method of claim 1, further comprising:
   receiving at least one selection consideration;
   identifying and invoking a scheduler module that is deemed appropriate for executing the compiled program based on said at least one selection consideration; and
   running the compiled program in a runtime environment that is associated with the scheduler module that has been selected, as directed by the scheduler module.

8. The method of claim 7, wherein said running comprises:
   at a time of execution of a work item within the compiled program, receiving at last one condition factor;
   selecting an instantiation of the work item based on said at least one condition factor; and
   performing the work item using the instantiation that is selected.

9. The method of claim 8, wherein said at least one condition factor comprises one or more of:
   heuristic information that identifies a user instruction;
   amount information that identifies an amount of data to be processed by the work item; or
   resource information that identifies amounts and kinds of computing resources that are available to perform the work item.

10. A physical and tangible computer readable storage device, which is not a transitory propagating signal, for storing computer readable instructions, the computer readable instructions providing a type-checking module when executed by one or more processing devices, the computer readable instructions comprising:
    logic configured to receive a dataflow-expressed program, the dataflow-expressed program including a plurality of tasks connected together in a manner specified by a graph, each task having at least one input associated with a specified type and an output associated with a specified type, the dataflow express program to be compiled to a compiled parallel program expressed in a parallel form that is executable by any runtime environment selected from a plurality of candidate runtime environments providing a plurality of computing resources for executing the compiled program in a parallel manner, the compiled parallel program agnostic with respect to features provided by the candidate runtime environments; and
    logic configured to perform static type-checking on the dataflow-expressed program to statically verify dataflow connections in the graph before the dataflow-expressed program instantiation and execution in the runtime environment to ensure that the nodes of the graph connect together in a permitted manner, said logic configured to perform static-checking comprising:

logic configured to determine, for each task, whether a type associated with each input that is supplied to the task matches an expected input type; and logic configured to determine, for each task, whether a number of inputs that are supplied to the task matches an expected number of inputs.

11. The computer readable storage device of claim 10, wherein the dataflow-expressed program expresses the graph as a directed acyclic graph.

12. The computer readable storage device of claim 10, wherein each task in the dataflow-expressed program is expressed as an object that specifies each type of each respective input, and a type of the output.

13. An environment for producing and executing a compiled parallel program, comprising:

compilation functionality, implemented by physical computing functionality, for producing the compiled parallel program, the compilation functionality comprising:

a graph-generation module configured to provide a dataflow-expressed program, the dataflow-expressed program including a plurality of tasks connected together in a manner specified by a directed acyclic graph, each task having at least one input associated with a specified type and an output associated with a specified type; and a compiler module configured to produce the compiled parallel program based on the dataflow-expressed program, the compiled parallel program expressed in a parallel form that is executable by the environment providing a plurality of computing resources for executing the compiled program in a parallel manner, the compiled parallel program agnostic with respect to features provided by a set of candidate runtime environments including the environment, the compiler module comprising:

a type-checking module configured to perform static type-checking on the dataflow-expressed program to identify the presence of any mismatch errors in the dataflow-expressed program before the dataflow-expressed program instantiation and execution in the environment to ensure that the nodes of the directed acyclic graph connect together in a permitted manner.

14. The environment of claim 13, wherein the graph-generation module is configured to provide the dataflow-expressed program using application programming interface (API) resources provided by a library module.

15. The environment of claim 13, wherein each task in the dataflow-expressed program is expressed as an object that specifies each type of each respective input, and a type of the output.

16. The environment of claim 13, wherein the type-checking module comprises:

logic configured to determine, for each task, whether a type associated with each input that is supplied to the task matches an expected input type; and logic configured to determine, for each task, whether a number of inputs that are supplied to the task matches an expected number of inputs.

17. The environment of claim 13, further comprising a runtime selection module that, in turn, comprises:

logic configured to receive at least one selection consideration; and logic configured to identify and invoke a scheduler module that is deemed appropriate for executing the compiled program based on said at least one selection consideration.

18. The environment of claim 17, further comprising a runtime engine that implements the scheduler module, the scheduler module comprising:

logic configured to receive at last one condition factor at a time of execution of a work item within the compiled program;

logic configured to select an instantiation of the work item based on said at least one condition factor; and logic configured to perform the work item using the instantiation that is selected.

19. The environment of claim 18, wherein said at least one condition factor comprises one or more of:

heuristic information that identifies a user instruction;

amount information that identifies an amount of data to be processed by the work item; or resource information that identifies amounts and kinds of computing resources that are available to perform the work item.

* * * * *